United States Patent
Wong

(10) Patent No.: US 10,993,059 B2
(45) Date of Patent: Apr. 27, 2021

(54) ENDPOINT MIXING PRODUCT

(71) Applicant: Siremix GmbH, Berlin (DE)

(72) Inventor: Wai Ming Wong, Hong Kong (HK)

(73) Assignee: SIREMIX GMBH, Berlin (DE)

( * ) Notice: Subject to any disclaimer, the term of this patent is extended or adjusted under 35 U.S.C. 154(b) by 0 days.

(21) Appl. No.: 16/319,971

(22) PCT Filed: Jun. 19, 2017

(86) PCT No.: PCT/IB2017/053616
§ 371 (c)(1),
(2) Date: Jan. 23, 2019

(87) PCT Pub. No.: WO2018/020337
PCT Pub. Date: Feb. 1, 2018

(65) Prior Publication Data
US 2019/0239012 A1     Aug. 1, 2019

(30) Foreign Application Priority Data
Jul. 28, 2016   (HK) .................. 16109029.8

(51) Int. Cl.
*H04S 3/00*    (2006.01)
*H04R 1/02*    (2006.01)
(Continued)

(52) U.S. Cl.
CPC ............ *H04S 3/002* (2013.01); *B25J 9/1664* (2013.01); *H04R 1/026* (2013.01); *H04R 5/02* (2013.01);
(Continued)

(58) Field of Classification Search
CPC .......... H04S 3/002; H04R 1/026; H04R 5/02; H04R 5/033; H04R 5/04; H04R 2201/025;
(Continued)

(56) References Cited

U.S. PATENT DOCUMENTS 3,824,343 A * 7/1974 Dahlquist ................ H04R 1/26
    381/335
6,721,434 B2 * 4/2004 Polk, Jr. ................ G06F 1/1605
    381/307
(Continued)

FOREIGN PATENT DOCUMENTS

CN    103118322 A    5/2013
CN    103650535 A    3/2014
(Continued)

*Primary Examiner* — Andrew L Sniezek
(74) *Attorney, Agent, or Firm* — Muncey, Geissler, Olds & Lows, P.C.

(57) ABSTRACT

The present invention discloses an endpoint mixing product having a control module and a speaker system. The speaker system includes speakers in which each speaker is with a 3D coordinate. The speakers communicate with the control module respectively. The control module is configured to deliver sound fragments to the speakers. The sound fragments contain 3D coordinates and correspond to the speakers respectively through the 3D coordinates. The speakers are configured to receive and play the corresponding sound fragments respectively to form an endpoint mixing sound.

6 Claims, 12 Drawing Sheets

(51) Int. Cl.
*H04R 5/02* (2006.01)
*H04R 5/033* (2006.01)
*H04R 5/04* (2006.01)
*B25J 9/16* (2006.01)

(52) U.S. Cl.
CPC ............ *H04R 5/033* (2013.01); *H04R 5/04* (2013.01); *H04R 2201/025* (2013.01); *H04R 2205/022* (2013.01); *H04R 2205/024* (2013.01); *H04S 3/004* (2013.01)

(58) Field of Classification Search
CPC ......... H04R 2205/022; H04R 2205/024; B25J 9/1664
See application file for complete search history.

(56) References Cited

U.S. PATENT DOCUMENTS

| | | | | |
|---|---|---|---|---|
| 2001/0052284 | A1* | 12/2001 | Kondo | G10H 1/32 84/718 |
| 2011/0228959 | A1* | 9/2011 | Meehan | H04S 3/002 381/307 |
| 2018/0115849 | A1* | 4/2018 | Breebaart | H04S 7/30 |

FOREIGN PATENT DOCUMENTS

| | | | | |
|---|---|---|---|---|
| CN | 104969576 A | | 10/2015 | |
| EP | 2922313 A1 | | 9/2015 | |
| FR | 2572237 | * | 4/1986 | ............ H04S 5/005 |
| HK | 1219390 A | | 3/2017 | |
| WO | WO 2013173780 A1 | | 11/2013 | |
| WO | WO 2015169124 A1 | | 11/2015 | |

* cited by examiner

ENDPOINT MIXING PRODUCT

FIELD OF THE INVENTION

The present application relates to the field of audio products, and more particularly relates to an endpoint mixing product.

BACKGROUND OF THE INVENTION

Many audio products can't play stereo documents, can't reveal all the details of natural sounds and can't reproduce the natural sounds. Audiences can't feel as if they were participating by these audio products.

SUMMARY OF THE INVENTION

The objective of the present application is to provide an endpoint mixing product, aiming at the defect that many audio products can't play stereo documents, can't reveal all the details of natural sounds and can't reproduce the natural sounds.

The technical solutions of the present application for solving the technical problems are as follows:

in one aspect, an endpoint mixing product comprising a control module and a speaker system is provided; the speaker system includes speakers, each with a 3D coordinate; and the speakers communicate with the control module respectively; and the control module is configured for delivering sound fragments to the speakers; the sound fragments contain 3D coordinates respectively, and the sound fragments correspond to the speakers respectively through the 3D coordinates; the speakers are configured for receiving and playing the corresponding sound fragments respectively to form an endpoint mixing sound.

In one embodiment, the speaker system is an endpoint mixing integrated speaker system; and the endpoint mixing integrated speaker system includes a mounting module, a frontend speaker layer and a backend speaker layer; and the frontend speaker layer and the backend speaker layer are arranged on the mounting module;

the number of speakers of the frontend speaker layer and the number of speakers of the backend speaker layer are both two; and the distance between the two speakers of the frontend speaker layer is smaller than the distance between the two speakers of the backend speaker layer, and the height of the speaker of the frontend speaker layer is lower than the height of the speaker of the backend speaker layer.

In another embodiment, the mounting module includes a base board made of wood; and the speakers are mounted on the base board; and the mounting module further includes a 5 faced speaker net that covers all the speakers.

In another embodiment, the endpoint mixing product is an endpoint mixing smartphone, and the endpoint mixing smartphone includes a case; and the speaker system and the control module are arranged on the case;

the speaker system is an endpoint mixing speaker array which includes a frontend speaker layer, a middle speaker layer and a backend speaker layer; and the frontend speaker layer is arranged on the bottom part of the case; and the middle speaker layer is arranged on the middle part of the case; and the backend speaker layer is arranged on the top part of the case.

In another embodiment, the endpoint mixing product is an endpoint mixing headphone, and the speaker system includes two endpoint mixing speaker arrays; the endpoint mixing headphone includes a right cup and a left cup, and the two endpoint mixing speaker arrays are respectively mounted on the right cup and the left cup;

Each of the endpoint mixing speaker arrays includes a frontend speaker layer and a backend speaker layer; and the frontend speaker layer is arranged on a first concave curved surface, and the backend speaker layer is arranged on a second concave curved surface; the first concave curved surface is coaxially arranged on the second concave curved surface.

In another embodiment, the frontend speaker layer includes 10 speakers; and the backend speaker layer includes 5 speakers; and the speakers of the frontend speaker layer forms a multiple triangular shape; and the speakers of the backend speaker layer are aligned in a shape of a cross.

In another embodiment, the speaker system includes speaker robots; and at least one speaker is arranged on each of the speaker robots.

In another embodiment, the endpoint mixing product is an endpoint mixing virtual reality system;

the control module of the endpoint mixing virtual reality system is a central computer; and the control module is configured for getting coordinate information of key objects inside a virtual world, generating commands for the speaker robots and delivering the commands to the speaker robots; and the key objects correspond to the speaker robots respectively through the coordinate information; and the speaker robots are configured for receiving the commands and moving with the corresponding key objects synchronously.

In another embodiment, the endpoint mixing product is an AlienSound, and the AlienSound includes a body and robotic arms mounted on the body; the speakers correspond to the robotic arms respectively; and each of the speakers is mounted on the corresponding robotic arm; and the control module is a central computer which is arranged inside a base board of the body to control movements of all robotic arms.

In another embodiment, the endpoint mixing product is an AlienSound, and the AlienSound includes robotic arms and more than one body; and a plurality of robotic arms are mounted on each of the bodies; and the speakers correspond to the robotic arms respectively; and each of the speakers is mounted on the corresponding robotic arm; and the control module is a central computer connected to the speakers and the robotic arms respectively; and the central computer is used to control movements of all the robotic arms.

When implementing the endpoint mixing product of the present application, the following advantageous effects can be achieved: The endpoint mixing product of the present application adopts speakers, each with a 3D coordinate, to play different sound fragments respectively to form an endpoint mixing sound which has a high sound quality.

BRIEF DESCRIPTION OF THE DRAWINGS

The present application will be further described with reference to the accompanying drawings and embodiments in the following, in the accompanying drawings.

DETAILED DESCRIPTION OF THE PREFERRED EMBODIMENT

The application provides an endpoint mixing product, and the endpoint mixing product comprises a control module and a speaker system; the speaker system includes speakers, each with a 3D coordinate; and the speakers communicate with the control module respectively; and the control module is configured for delivering sound fragments to the speakers; the sound fragments contain 3D coordinates respectively, and the sound fragments correspond to the speakers respectively through the 3D coordinates; the speakers are configured for receiving and playing the corresponding sound fragments respectively to form an endpoint mixing sound. Furthermore, the speaker system includes speaker robots, and at least one speaker is arranged on the speaker robot.

Specifically, the endpoint mixing product is described as follows.

Barebones Phone

Product Design.

Figure 1:
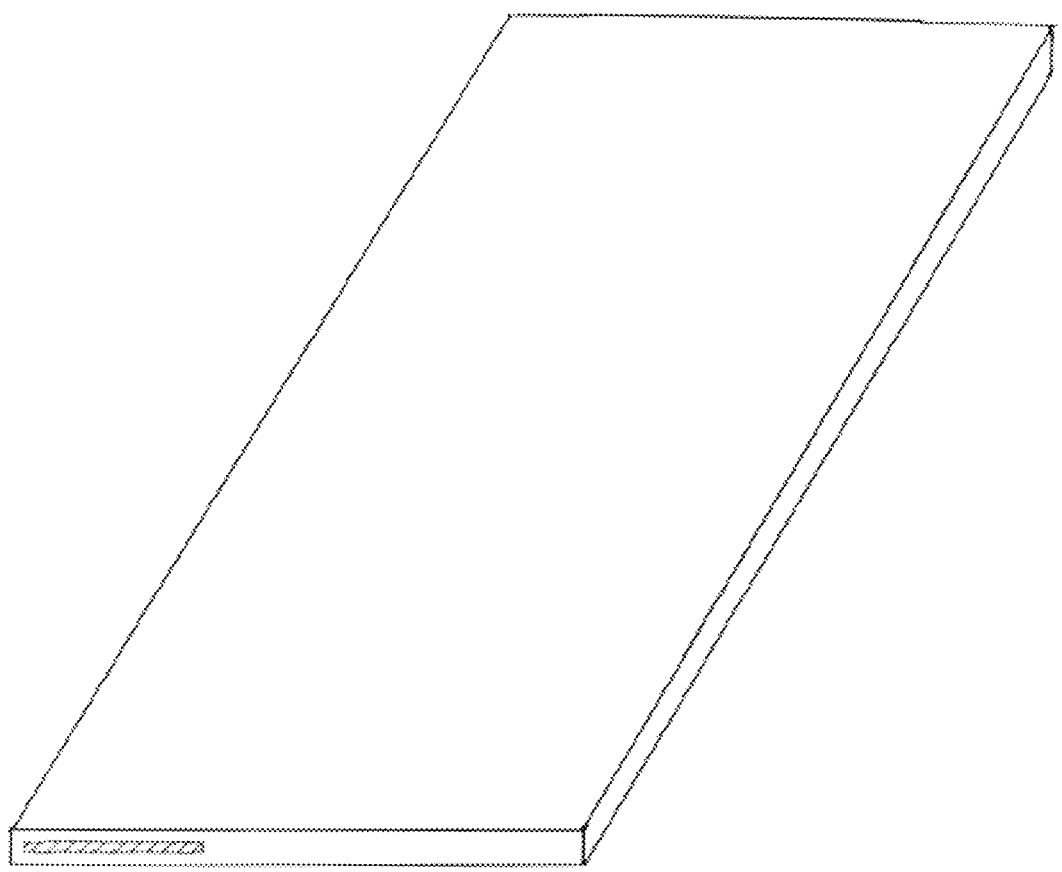
FIG. 1 is a schematic view of a barebones phone of a preferred embodiment of the present application.

As shown in FIG. 1, the control module can be a barebones phone; and the barebones phone is a smartphone that has no touchscreen, and the barebones phone is functioning properly only after being sucked inside a host.

The barebones phone can include a CPU, an ROM, an RAM, a storage device, a Local Communication Interface, a Multimedia Communication Interface, a Networking Device, a Mobile Network Device and any other necessary electronic components and sensors available with the smartphone.

The Local Communication Interface can be a USB 2.0 interface or a USB 3.0 interface; the Multimedia Communication Interface can be an HDMI, a DVI or an SDI; the Networking Device can be a WiFi module, a ZigBee module and so on; and the Mobile Network Device can be a 3G communication module or a 4G communication module.

The host can be one of the followings:
an endpoint mixing smartphone;
an endpoint mixing PC;
an endpoint mixing Tablet;
an endpoint mixing TV;
an endpoint mixing entertainment system, e.g. a game console, a DVD player, a set-top-box etc;
a wall socket of a smart home, an office room, or a hotel room;
a smart furniture, e.g. a smart table;
a roadside kiosk;
a car;
a plane seat;
a cinemas equipped with high end VR;
a robot; and
any other thing that is big enough to have a tiny computer module and a sucking socket for the barebones phone.

Operation of the Barebones Phone

1. Slightly push the barebones phone into an opening of the sucking socket of the host and the barebones phone is sucked into the host automatically. The movement of the barebones phone will be completed between 1-3 seconds.

2. Inside the host, internal cables of the barebones phone will be automatically connected to all relevant devices of the host, e.g. an HDMI of the barebones phone connects to a screen or a speaker of a car respectively. The connection time will be completed within 1 second.

3. All relevant devices of the host will be enabled based on the nature of the barebones phone, for example, in case of the endpoint mixing PC serving as a host, the PC screen will display a screen signal produced by an OS inside the barebones phone via an HDMI.

4. When a user finishes using the barebones phone with the host, he/she can press a touch button nearby the sucking socket and retrieve the barebones phone from the host within 0.5 second.

Points to Note

When a barebones phone is connected to and working inside a host, the barebones phone is charged at the same time.

Due to limitation of today's technology, in case that automatic sucking, automatic releasing or automatic internal cable connection mechanisms is not possible, manually pushing the barebones phone into the sucking socket and connecting the barebones phone to a connector of the host are required.

The sucking socket of the host can be replaced by an NFC and a wireless power charging module, so a user can simply drop the barebones phone in the host and the barebones phone will automatically be charged and communicate with the host.

Endpoint Mixing Speaker Array

Product Design

Figure 2:
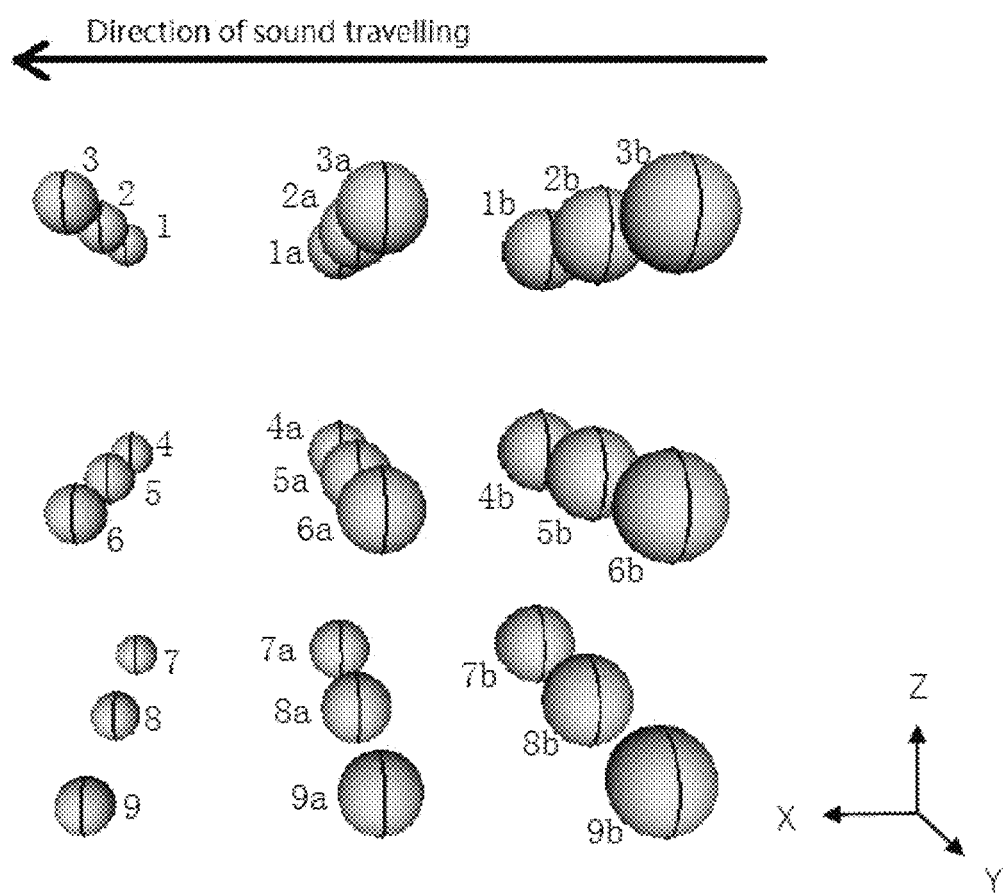
FIG. 2 is a schematic view of an endpoint mixing speaker array of a preferred embodiment of the present application.
Figure 3:
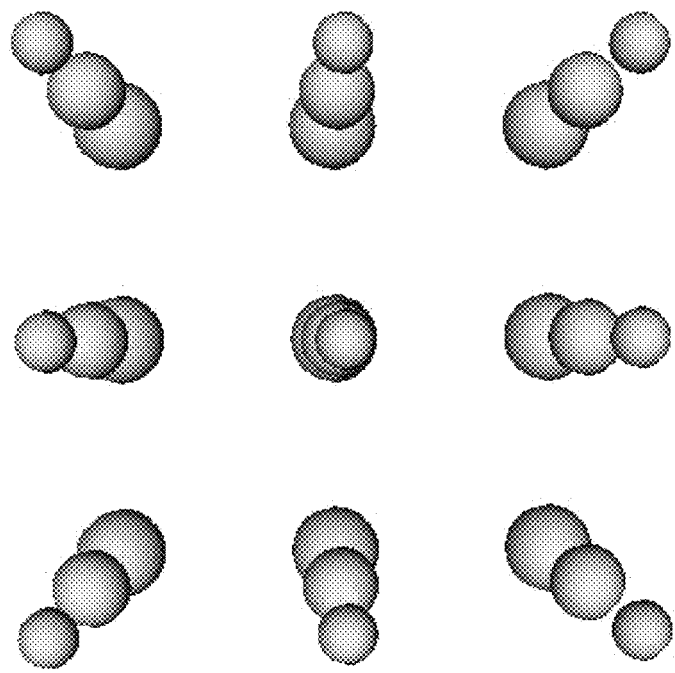
FIG. 3 is another schematic view of the endpoint mixing speaker array shown in FIG. 2.

The speaker system can be an endpoint mixing speaker array. As shown in FIGS. 2 and 3, the endpoint mixing speaker array includes 27 speakers, and each of the speakers is indicated by a sphere in the figures. These speakers are arranged as 3 speaker layers along the X axis, 3 speaker layers along the Y axis, and 3 speaker layers along the Z axis. The X axis, the Y axis and the Z axis are mutually perpendicular.

As indicated in FIG. 2, a main direction of sound travelling is from backend towards frontend of the speaker system along the X axis. However, this only indicates the main direction of sound travelling, and sounds may also travel at other directions from each of the speakers.

The most suitable speaker to be used inside the endpoint mixing speaker array is high quality omnidirectional speaker.

As indicated in FIG. 2, we can see three speaker layers of the speaker system:

1. Backend Speaker Layer

The backend speaker layer of the speaker system is located at the back side of the speaker system and contains 9 speakers; and each of these speakers produces sounds travelling mainly to the forward direction, and the size of these speakers is largest among the whole speaker system. (i.e. 1*b*, 2*b*, 3*b*, 4*b*, 5*b*, 6*b*, 7*b*, 8*b*, 9*b*)

2. Middle Speaker Layer

The middle speaker layer of the speaker system is locate at the middle area of the speaker system and contains 9 speakers; and each of these speakers produces sounds travelling mainly to the forward direction, and the size of these speakers is smaller than that of the speakers of the backend speaker layer. (i.e. 1a, 2a, 3a, 4a, 5a, 6a, 7a, 8a, 9a)

3. Frontend Speaker Layer

The frontend speaker layer of the speaker system is located at the front side of the speaker system and contains 9 speakers; and each of these speakers produces sounds travelling mainly to the forward direction, and the size of these speakers is smaller than that of the speakers of middle speaker layer. (i.e. 1, 2, 3, 4, 5, 6, 7, 8, 9)

Points to Note

The number of speakers of the backend speaker layer, the middle speaker layer or the frontend speaker layer is not limited to 9. And the arrangement of speakers can be more or less misaligned from the coordinates as described above.

The shape of the endpoint mixing speaker array can be altered, for example, the backend speaker layer, the middle speaker layer or the frontend speaker layer can be blended into a concave curved surface, so it is more suitable to fix the speaker system inside a container with the shape of hemisphere. Or the backend speaker layer, the middle speaker layer or the frontend speaker layer can be blended into a convex curved surface, so it is more suitable to fix the speaker system inside a container with the shape of sphere, and etc.

Endpoint Mixing Integrated Speaker System

Product Design

Figure 4:
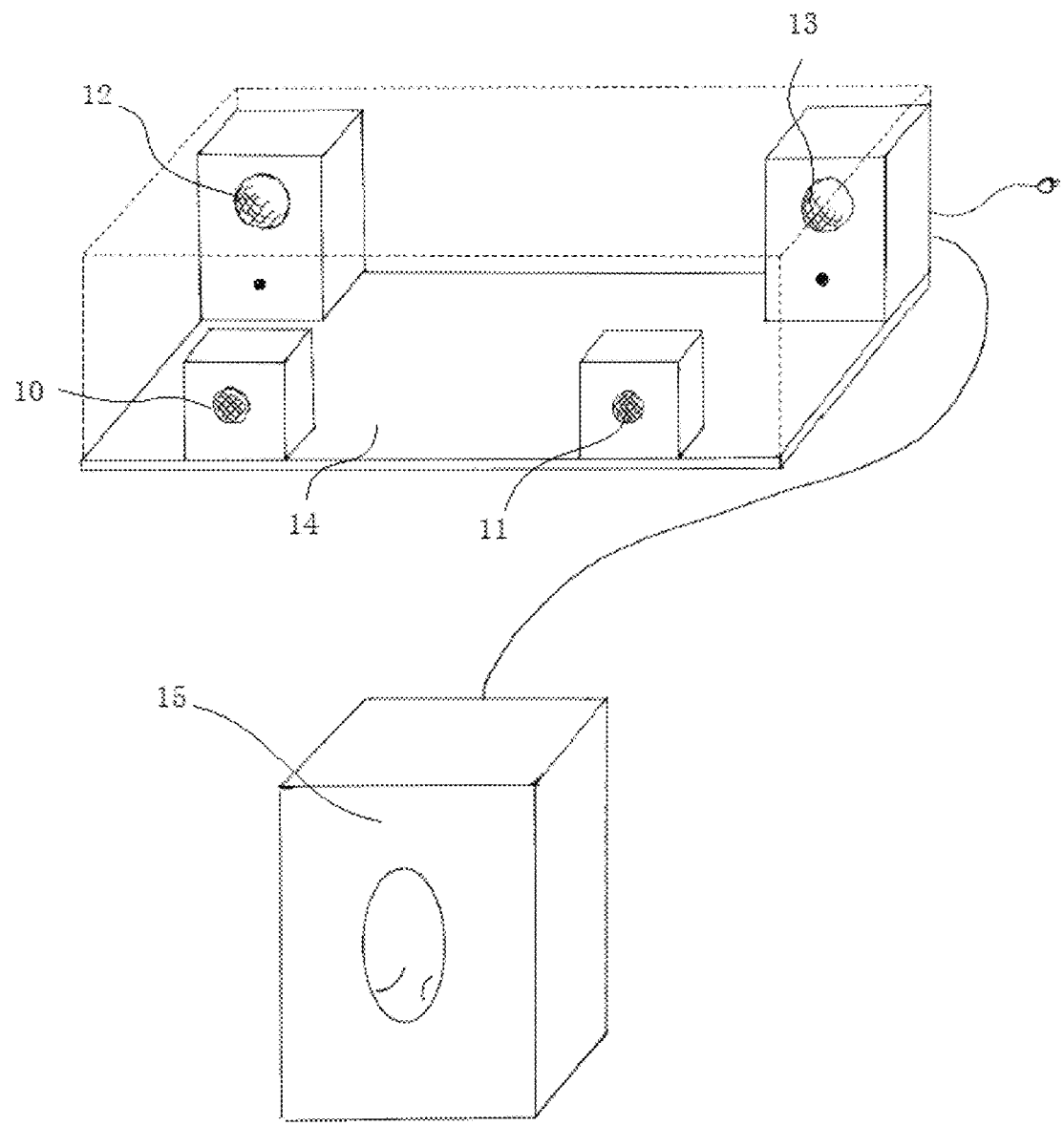
FIG. 4 is a schematic view of an endpoint mixing integrated speaker system of a preferred embodiment of the present application.

As shown in FIG. 4, the speaker system is an endpoint mixing integrated speaker system, which is a variation of the endpoint mixing speaker array. The endpoint mixing integrated speaker system includes a mounting module 14 and only two speaker layers, i.e. the frontend speaker layer (i.e. 10 and 11) and the backend speaker layer (i.e. 12 and 13). The two speaker layers are arranged on the mounting module 14. The number of speakers of each the speaker layer is 2. Moreover, the distance between the two speakers of the frontend speaker layer is smaller than the distance between the two speakers of the backend speaker layer, and the height of the speaker of the frontend speaker layer is lower than the height of the speaker of the backend speaker layer.

The endpoint mixing integrated speaker system is designed to be powered by AC power, and the endpoint mixing integrated speaker system can also be powered by a battery mounted inside the mounting module 14.

In this embodiment, the mounting module 14 includes a base board made of wood, which can provide high quality sound reflections; and the speakers are mounted on the base board. Moreover, the mounting module 14 further includes a 5 faced speaker net that is indicated in dotted lines in the FIG. 4; and the 5 faced speaker net covers all the speakers. The key uniqueness of the 5 faced speaker net enables sounds from the speakers to spread out through 5 different directions.

Multiple speakers produce sounds towards the front and side; the base board reflects sounds towards the front and top; and other sound reflections occur at multiple directions.

The dimension of the endpoint mixing integrated speaker system can be changed based on designed utility. For instance, the endpoint mixing integrated speaker system used underneath a LEDTV is long shaped like a soundbar.

Furthermore, the endpoint mixing integrated speaker system includes a subwoofer 15, and the subwoofer 15 is also connected to the control module. The subwoofer is designed to add LFE (Low Frequency Effect) to enhance the overall performance of sound production of the endpoint mixing integrated speaker system.

Points to Note

The 5 faced speaker net is detectable, and a user can easily replace it by other speaker net with a different design, size, color, shape, or material.

The subwoofer can be arranged underneath the base board or between the two speakers of the backend speaker layer.

And the subwoofer can be omitted in another embodiment.

In another embodiment, the frontend speaker layer can include one speaker.

In another embodiment, the endpoint mixing integrated speaker system has a pluggable modular stacking boxes located at the space between the two speakers of the frontend speaker layer; and the pluggable modular is configured for adding functionalities. The pluggable modular can be:

an iPhone docking (or a sucking socket for a barebones phone);

an Android docking;

a touch screen LED display for communicating with a user;

a CD player;

a digital home integration with multi-room support;

a Hi-res support with detail sound quality tuning buttons on a front panel; or an entetainment system, e.g. a DVD player, a game console, a set-top-box etc.

The endpoint mixing integrated speaker system can be an additional display output port for connecting to a TV, e.g. a HDMI output port. And if a user has smartphone or a barebones phone connected to the endpoint mixing integrated speaker system, the TV screen can display APPs and data inside the smartphone or the barebones phone.

Endpoint Mixing Smartphone

Product Design

Figure 5:
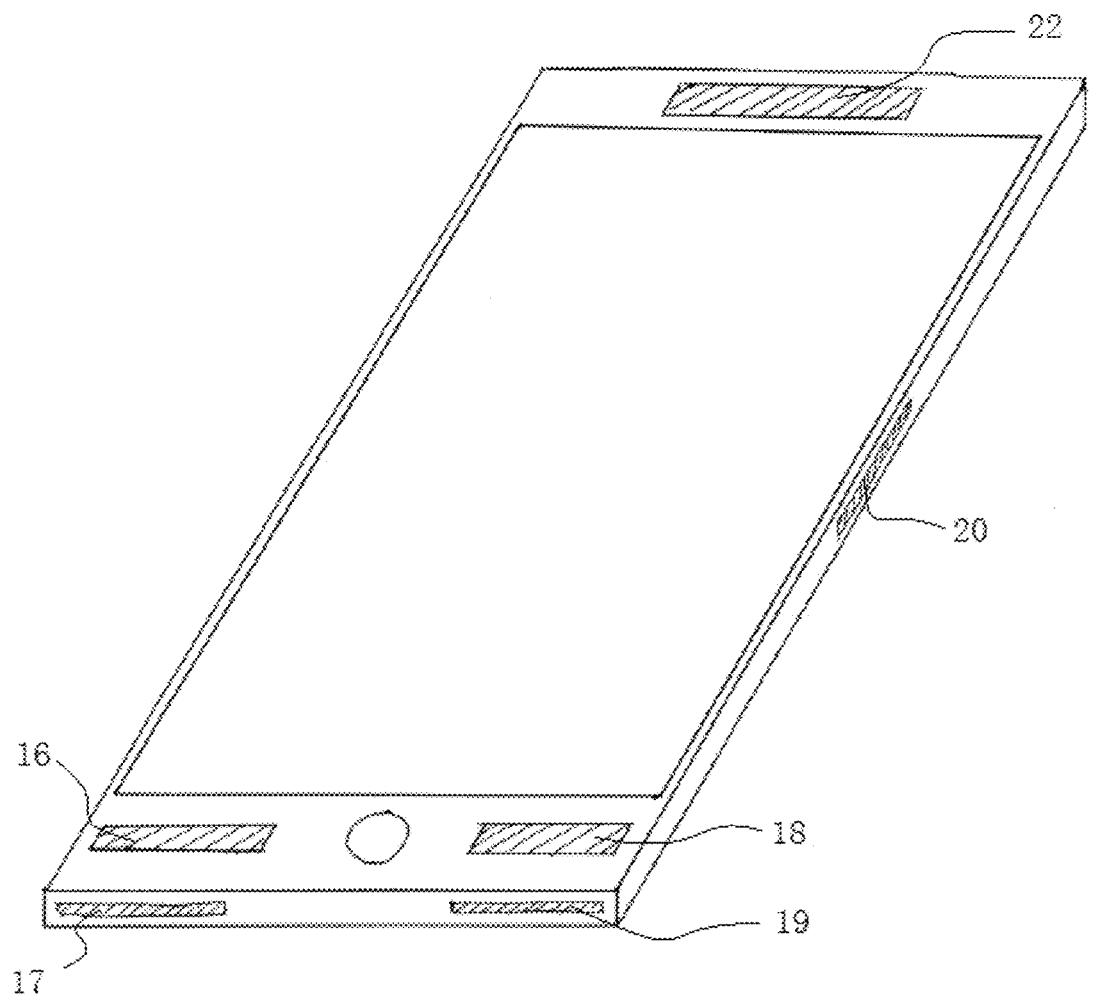
FIG. 5 is a schematic view of an endpoint mixing smartphone of a preferred embodiment of the present application.
Figure 6:
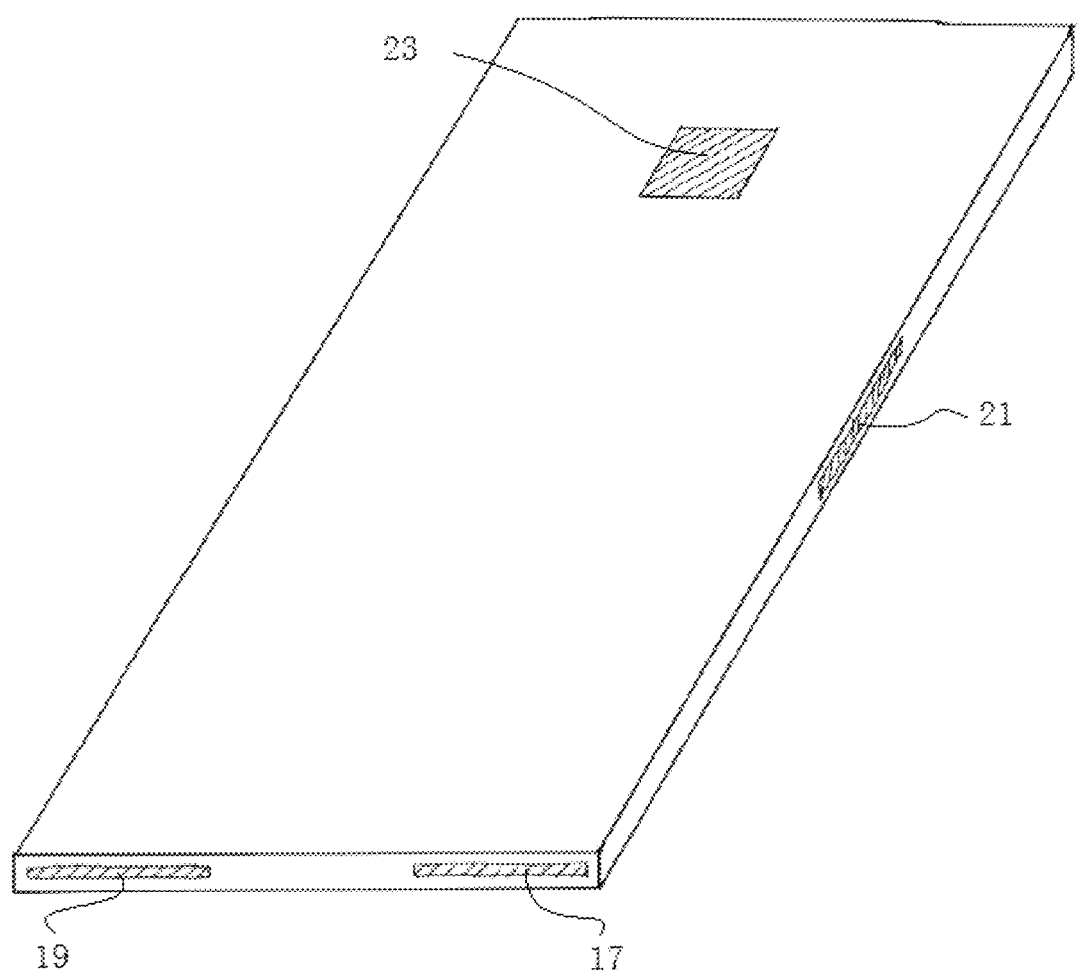
FIG. 6 is another schematic view of the endpoint mixing smartphone shown in FIG. 5.

As shown in FIGS. 5 and 6, the endpoint mixing product is an endpoint mixing smartphone, and the endpoint mixing smartphone includes a case; and the speaker system and the control module are arranged on the case. The speaker system is the endpoint mixing speaker array which includes a frontend speaker layer, a middle speaker layer and a backend speaker layer. The frontend speaker layer (includes speakers 16, 17, 18, 19) is arranged on the bottom part of the case; the middle speaker layer (includes speakers 20 and 21) is arranged on the middle part of the case; and the backend speaker layer (includes speakers 22, 23) is arranged on the top part of the case.

Points to Note

In another embodiment, the endpoint mixing smartphone applies a Frequency Fragmentation and Position Process (F2P2) to process and direct sound fragments to play at different speakers.

In another embodiment, the endpoint mixing smartphone only includes a case and a touch screen mounted on the case; a sucking socket is arranged on the case. The sucking socket is configured for a barebones phone to be sucked inside, so that the endpoint mixing smartphone can have an endpoint mixing function. The endpoint mixing smartphone of this embodiment allows a user to change the size, design, color, peripheral (e.g. camera) of the case.

Endpoint Mixing Pc

Product Design

Figure 7:
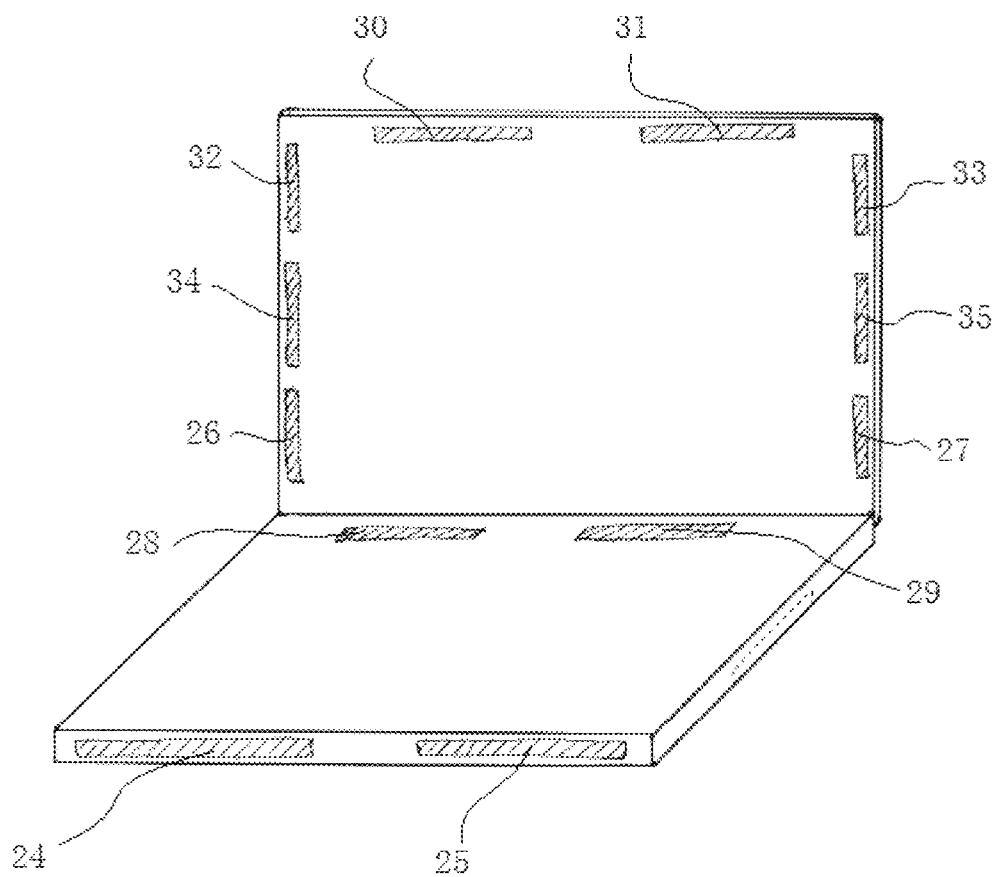
FIG. 7 is a schematic view of an endpoint mixing PC of a preferred embodiment of the present application.

As shown in FIG. 7, the endpoint mixing product is an endpoint mixing PC; and the endpoint mixing PC is a laptop computer with the speaker system, and the speaker system is the endpoint mixing speaker array. The endpoint mixing speaker array includes a frontend speaker layer, a middle speaker layer and a backend speaker layer. The frontend speaker layer (includes speakers 24, 25) is arranged on the bottom part of the laptop computer; the middle speaker layer (includes speakers 26, 27, 28, 29) is arranged on the middle part of the laptop computer; and the backend speaker layer (includes speakers 30, 31, 32, 33, 34, 35) is arranged on the top part of the laptop computer.

Points to Note

In another embodiment, the endpoint mixing PC applies a F2P2 to process and direct sound fragments to play at different speakers.

In another embodiment, the endpoint mixing PC includes a case, and a sucking socket is arranged on the case. The sucking socket is configured for a barebones phone to be sucked inside, so that the OS, APPs and Data of the barebones phone can be used through the endpoint mixing PC.

The endpoint mixing PC can be a desktop computer; and the desktop computer can includes a case, and the sucking socket is arranged on the case.

Endpoint Mixing Headphone

Product Design

Figure 8:
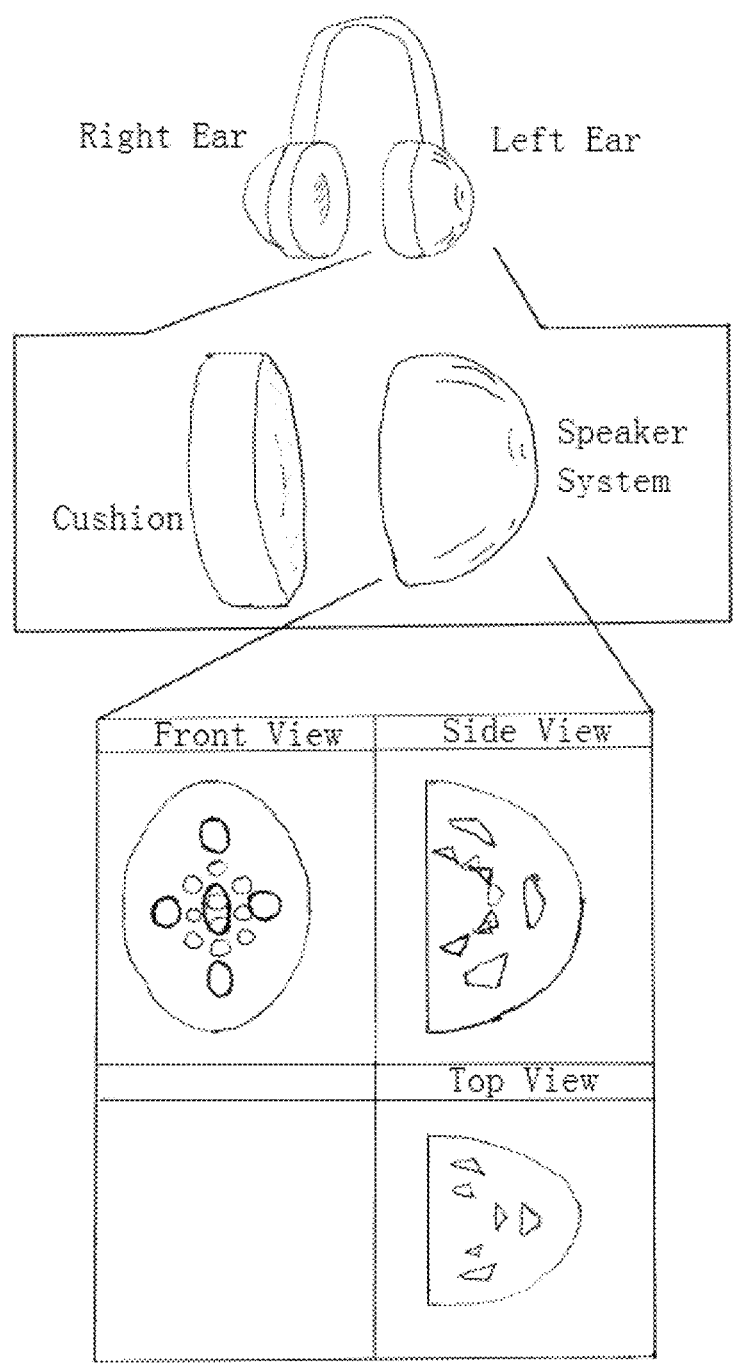
FIG. 8 is a schematic view of an endpoint mixing headphone of a preferred embodiment of the present application.

As shown in FIG. 8, the endpoint mixing product is an endpoint mixing headphone, and the endpoint mixing headphone includes a speaker system, and the speaker system includes two endpoint mixing speaker arrays; the endpoint mixing headphone includes a right cup and a left cup, and the two endpoint mixing speaker arrays are respectively mounted on the right cup and the left cup.

Each of the endpoint mixing speaker arrays includes a frontend speaker layer and a backend speaker layer. The frontend speaker layer is arranged on a first concave curved surface, and the backend speaker layer is arranged on a second concave curved surface; the first concave curved surface is coaxially arranged on the second concave curved surface; and the frontend speaker layer includes 10 speakers, and the backend speaker layer includes 5 speakers. The speakers of the frontend speaker layer forms a multiple triangular shape; and the speakers of the backend speaker layer are aligned in a shape of a cross.

Points to Note

Each of the endpoint mixing speaker arrays can include more than two speaker layers.

Endpoint Mixing Theater

Product Design

Figure 9:
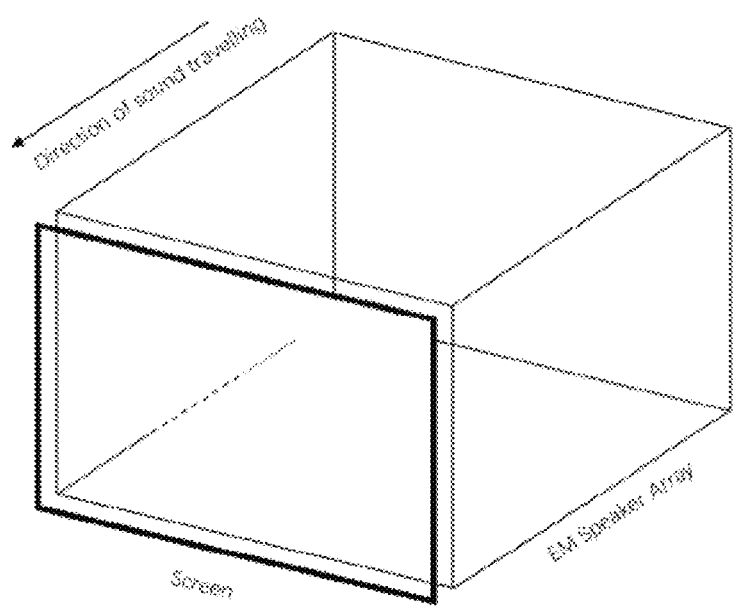
FIG. 9 is a schematic view of an endpoint mixing theater of a preferred embodiment of the present application.

As shown in FIG. 9, the endpoint mixing product is an endpoint mixing theater equipped with an endpoint mixing speaker array (i.e. EM Speaker Array). The endpoint mixing speaker array is situated behind a screen, and sounds produced from the endpoint mixing speaker array travel in the front direction as indicated in FIG. 9, go through the screen and fill space inside the theater where audiences are located.

Advantageously, the endpoint mixing theater can be an IMAX cinema, the IMAX cinema allows speakers to be placed behind the screen. Therefore, the implementation of the endpoint mixing theater is to construct a new type of IMAX cinema with extended space behind the screen for placing the endpoint mixing speaker array, and the screen characteristics of the IMAX cinema allows sounds generated by the endpoint mixing speaker array to pass through the screen for reaching the audiences.

Points to Note

The endpoint mixing speaker array can be arranged on a left side and a right side of the theater; or the endpoint mixing speaker array can be arranged on a ceiling of the theater; or the endpoint mixing speaker array can be arranged on a back side of the theater.

The endpoint mixing theater can be arranged at home. The endpoint mixing speaker array is arranged at home.

The endpoint mixing theater can be arranged inside a vehicle.

Endpoint Mixing Virtual Reality System

Product Design

Figure 10:
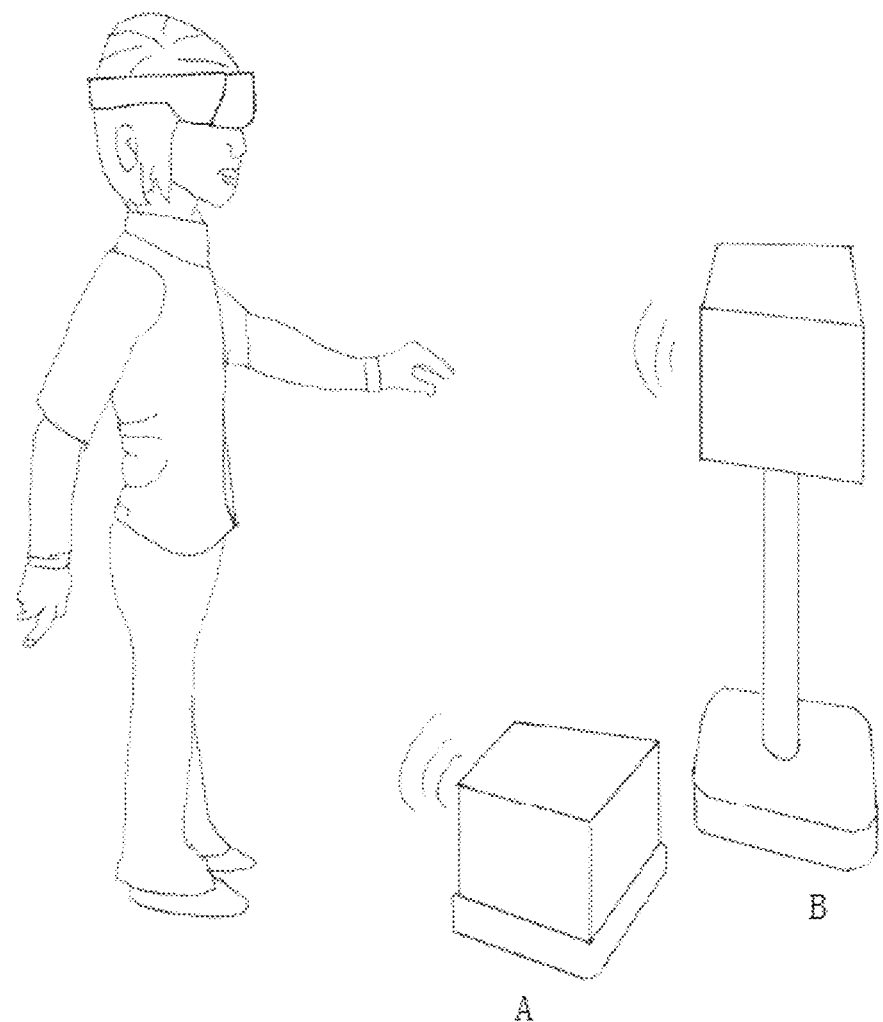
FIG. 10 is a schematic view of an endpoint mixing virtual reality system of a preferred embodiment of the present application.

As shown in FIG. 10, the endpoint mixing product is an endpoint mixing virtual reality system which is a virtual reality system based on endpoint mixing for creating 3D sound images of all key objects that match with the 3D coordinates of objects inside the virtual world. The endpoint mixing virtual reality system can utilize 3D sound characteristics of endpoint mixing to create highly realistic virtual reality experience.

The control module of the endpoint mixing virtual reality system is a central computer. Software modules are added to the virtual reality system (for example, Playstation) for capturing coordinate information of the key objects inside the virtual world and providing the coordinate information to the central computer. Inside the central computer, the key objects are identified from the coordinate information received and commands for speaker robots are generated accordingly and delivered to the speaker robots in real-time. The key objects correspond to the speaker robots respectively through the coordinate information; and the speaker robots are configured for receiving the commands and moving with the corresponding key objects synchronously.

As shown in FIG. 10, two speaker robots i.e., Item A and Item B can be seen. In the virtual world, item A is a dog running towards the audience while baking at the same time, and Item. B is a lady standing and speaking to the audience. Item A can move like the dog in the virtual world, and Item. B can move like the lady in the virtual world. An actual distance between the audience and Item A or Item B is the same as the distance perceived visually in the virtual world.

The method of matching 3D coordinates of the key objects inside the virtual world to 3D coordinates of the speaker robots respectively is to identify all the key objects within a certain radian distance from the audience. This radian distance is determined by the size of the room where the audience is located. For example, if audience is located at the center of a room, and the maximum distance from the audience to a wall of the room is 3 meters, the radian distance in the virtual world for key object identification is 3 meters. Finally, 3D coordinate of the key objects inside the virtual world is translated to command to the speaker robots.

Item(s) located on top of a speaker robot can be one of the followings:

a sound system for creating sounds;

a fan for creating wind;

a scent synthesizer for creating smells;

an endpoint mixing TV for creating images and sounds.

If a sound system is located on top of a speaker robot, the sound system can be one of the followings:

a regular speaker;

an omnidirectional speaker;

the endpoint mixing speaker array;

the robots on the board;

an Aliensound.

In order to enhance overall virtual reality sound experience, the endpoint mixing virtual reality system can be installed inside the endpoint mixing theater with the endpoint mixing speaker array.

Points to Note

In another embodiment, the sucking socket configured for a smartphone or a barebones phone is arranged on the central computer. Thus, a user can enter a virtual world, of which data is stored in the smartphone or the barebones phone.

An additional sound system may be added to enhance overall virtual reality experience. The additional sound system can be one of the followings:
  an endpoint mixing TV;
  a surround sound system;
  a stereo system.

Endpoint Mixing Tv

Product Design

Figure 11:
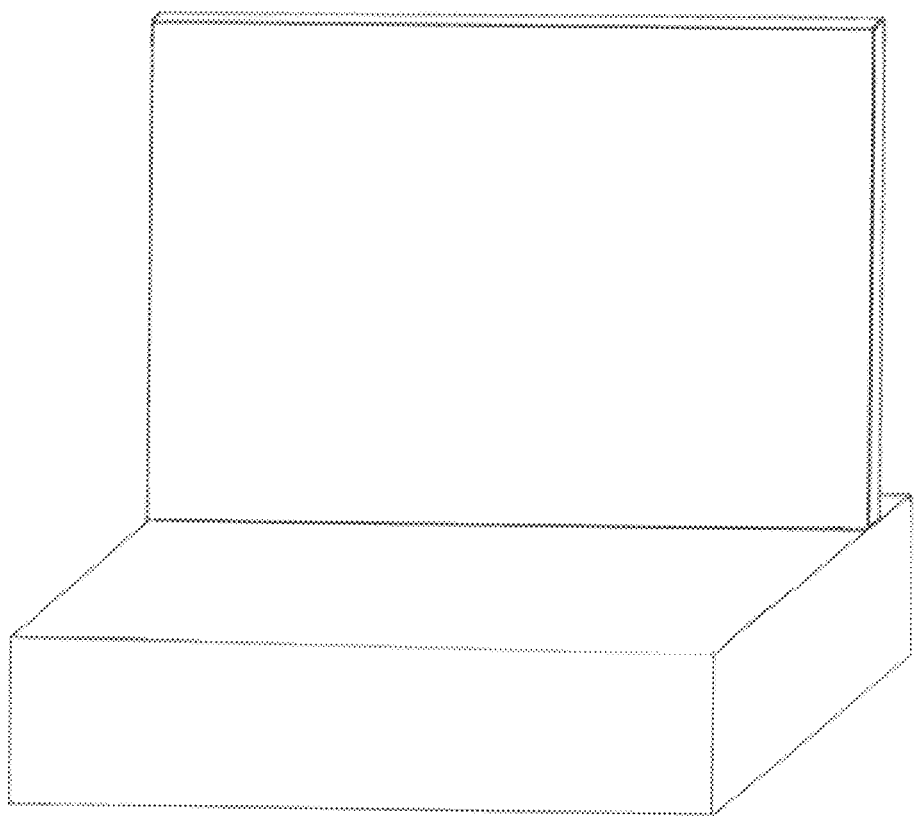
FIG. 11 is a schematic view of an endpoint mixing TV of a preferred embodiment of the present application.

As shown in FIG. 11, the endpoint mixing product is an endpoint mixing TV which is a product combined a TV with the endpoint mixing integrated speaker system. The kind of a display screen of the TV, and the display technology of the TV aren't limited. Advantageously; the TV can be a LEDTV. In additions, the endpoint mixing integrated speaker system can be replaced by another aforementioned endpoint mixing product.

Points to Note

In another embodiment, the endpoint mixing TV includes a projector screen configured for displaying video and audio data, the endpoint mixing speaker array is arranged behind the projector screen. Sounds can flow through the projector screen freely.

In another embodiment, the endpoint mixing TV includes a LED screen configured for displaying video and audio data, the endpoint mixing speaker array is arranged behind the LED screen. The LED screen includes a LED array, and at least one hole is defined between any two adjacent LED units of the LED array. Sounds can flow through the hole freely.

Aliensound

Product Design

Figure 12:
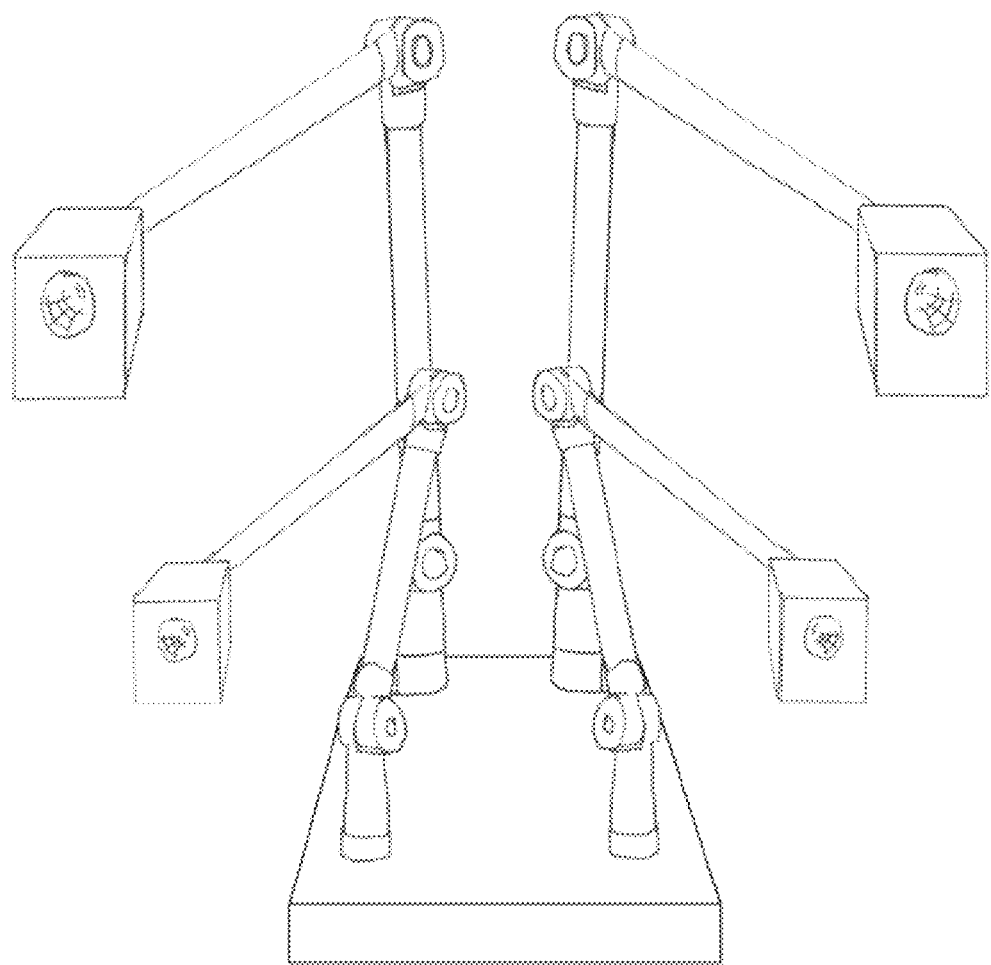
FIG. 12 is a schematic view of an AlienSound of a preferred embodiment of the present application.

As shown in FIG. 12, the endpoint mixing product is an AlienSound, and the AlienSound includes a body and robotic arms mounted on the body; the AlienSound further includes speakers corresponding to the robotic arms respectively; and each of the speakers is mounted on the corresponding robotic arm. The AlienSound is designed for producing sounds according to endpoint mixing sound production principles. A central computer is arranged inside a base board of the body to control synchronized movements of all robotic arms, so speakers can move to destined 3D coordinates respectively according to speaker location information. Speakers on these robotic arms are regular speakers.

Points to Note

In another embodiment, the AlienSound includes a subwoofer connected to the central computer and configured for producing LFE (Low Frequency Effect).

The speaker can be replaced by an omnidirectional speaker, an endpoint mixing speaker array, an endpoint mixing integrated speaker system, a speaker robot on a board, an endpoint mixing PC or an endpoint mixing TV.

In another embodiment, the AlienSound can includes robotic arms and more than one body, and a plurality of robotic arms are mounted on each of the bodies; the AlienSound further includes speakers corresponding to the robotic arms respectively; all the speakers and all the robotic arms are connected to a central computer; and the central computer is used to receive and process sound sources, and generate commands to all the robotic arms to position all the speakers at destined coordinates respectively, and control all the speakers to produce sound fragments respectively, so that an endpoint mixing sound is formed.

Producing Sounds

This section describes how sounds are produced. Sounds are produced based on receiving signals providing to the speaker system in real-time. There are three main types of sound sources: Stereo, Surround. Sound, and Endpoint Mixing.

Sound processing and producing method are:

1. For sound sources of Stereo and Surround Sound, Frequency Fragmentation and Position Process (F2P2) is used, such that a sound from the sound source can be broken down into sound fragments of channels (e.g. for stereo, the channel is either a left channel or a right channel, and for 5.1 surround sound, the channel can be a front left channel, a front right channel, a rear left channel, a rear right channel, a center channel and a LFE (Low Frequency Effect) channel). Each the sound fragment is isolated. And then, 3D position information is added to each the sound fragment. Finally, each the sound fragment is directed to a speaker of a designed region based on its 3D position information, and is played by the speaker.

The sound fragmentation approach and positioning technique isn't limited to Frequency Fragmentation and Position Process (F2P2). The application describes the overall spirit of the method such that the endpoint mixing product takes sound fragments from the channels and processes them, and then directs each the sound fragment to the speaker in the speaker system in order to create an endpoint mixing sound.

2. For sound source of Endpoint Mixing, there are two major differences compare to point 1 above: firstly, musical instruments (or sound producing Objects) are already isolated during a sound recording and transmission process with high quality, so there is no need to perform any fragmentation process. Second, 3D position information of each the musical instrument is already created. Therefore, after receiving sound fragments, the speaker system can direct each of the sound fragments to be played by the corresponding speaker based on the 3D position information.

Points to Note:

If the sound fragment does not contain 3D position information, the speaker system will use its own logic to assign 3D position information to the sound fragment. The basic idea of this logic follows four rules: firstly, the distance between musical instruments (or sound producing objects) is always maximized so that an additional musical instrument (or a sound producing object) can be arranged inside; secondly, a high frequency sound fragment is played at the frontend speaker layer, a low frequency sound fragment is played at the backend speaker layer, and a middle frequency sound fragment is played at the middle speaker layer; thirdly, sounds of flying objects (e.g. birds) are played at the top level, sounds of animals, humans and musical instruments are played at the middle level, and sounds of anything related to ground and sea are played at the bottom level; fourth, sounds of the most important humans, musical instruments and sound producing objects should be played at center. There is no strict rule to decide what goes to the left and what goes to the right, but a general sense of balance should be applied, for example, male on the left, female on the right.

For the speaker system that adopts speaker robots to produce sounds, the speaker robots can be controlled to move to assigned 3D positions respectively.

While the embodiments of the present application are described with reference to the accompanying drawings above, the present application is not limited to the above-mentioned specific implementations. In fact, the above-mentioned specific implementations are intended to be exemplary not to be limiting. In the inspiration of the present application, those ordinary skills in the art can also make many modifications without breaking away from the subject of the present application and the protection scope of the claims. All these modifications belong to the protection of the present application.

The invention claimed is:

1. An endpoint mixing product, comprising a control module and a speaker system, wherein the speaker system includes speakers, each with a 3D coordinate;

wherein the speakers of the speaker system are arranged into a 3D array facing a same direction to generate sounds travelling to an audience; and the speakers communicate with the control module respectively; and the control module is configured for delivering sound fragments to the speakers; the sound fragments contain 3D coordinates respectively of the speakers, and the sound fragments correspond to the speakers respectively through the 3D coordinates; the speakers are configured for receiving and playing the corresponding sound fragments respectively to form an endpoint mixing sound;

wherein the speaker system is an endpoint mixing integrated speaker system; and the endpoint mixing integrated speaker system includes a mounting module, a frontend speaker layer and a backend speaker layer; and the frontend speaker layer and the backend speaker layer are arranged on the mounting module;

the number of speakers of the frontend speaker layer and the number of speakers of the backend speaker layer are both two; and the distance between the two speakers of the frontend speaker layer is smaller than the distance between the two speakers of the backend speaker layer, and the height of the speaker of the frontend speaker layer is lower than the height of the speaker of the backend speaker layer.

2. The endpoint mixing product according to claim 1, wherein the mounting module includes a base board made of wood; and the speakers are mounted on the base board; and the mounting module further includes a speaker net that covers all the speakers.

3. The endpoint mixing product according to claim 1, wherein the speaker system includes speaker robots; and at least one speaker is arranged on each of the speaker robots.

4. The endpoint mixing product according to claim 3, wherein the endpoint mixing product is an endpoint mixing virtual reality system;

the control module of the endpoint mixing virtual reality system is a central computer, and the control module is configured for getting coordinate information of key objects inside a virtual world, generating commands for the speaker robots and delivering the commands to the speaker robots; and the key objects correspond to the speaker robots respectively through the coordinate information; and the speaker robots are configured for receiving the commands and moving with the corresponding key objects synchronously.

5. The endpoint mixing product according to claim 1, wherein the endpoint mixing product is an AlienSound, and the AlienSound includes a body and robotic arms mounted on the body; the speakers correspond to the robotic arms respectively; and each of the speakers is mounted on the corresponding robotic arm; and the control module is a central computer which is arranged inside a base board of the body to control movements of all robotic arms.

6. The endpoint mixing product according to claim 1, wherein the endpoint mixing product is an AlienSound, and the AlienSound includes robotic arms and more than one body; and a plurality of robotic arms are mounted on each of the bodies; and the speakers correspond to the robotic arms respectively; and each of the speakers is mounted on the corresponding robotic arm; and the control module is a central computer connected to the speakers and the robotic arms respectively; and the central computer is used to control movements of all the robotic arms.

* * * * *